Figure 1:
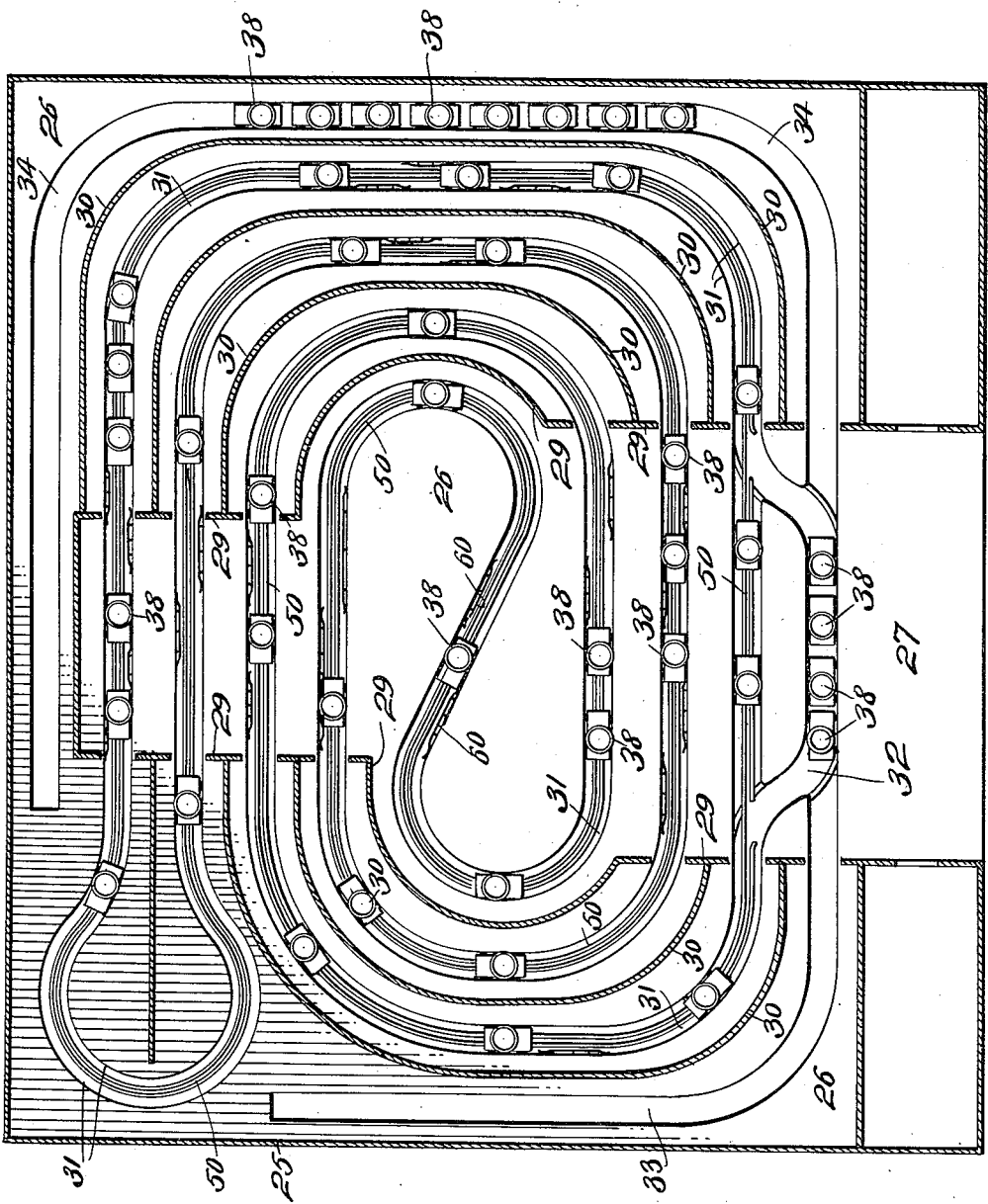

H. THURSTON.
AMUSEMENT APPARATUS.
APPLICATION FILED MAY 25, 1912.

1,083,308.

Patented Jan. 6, 1914.

7 SHEETS—SHEET 1.

WITNESSES:

INVENTOR
Howard Thurston
BY
Chas. C. Gill
ATTORNEY

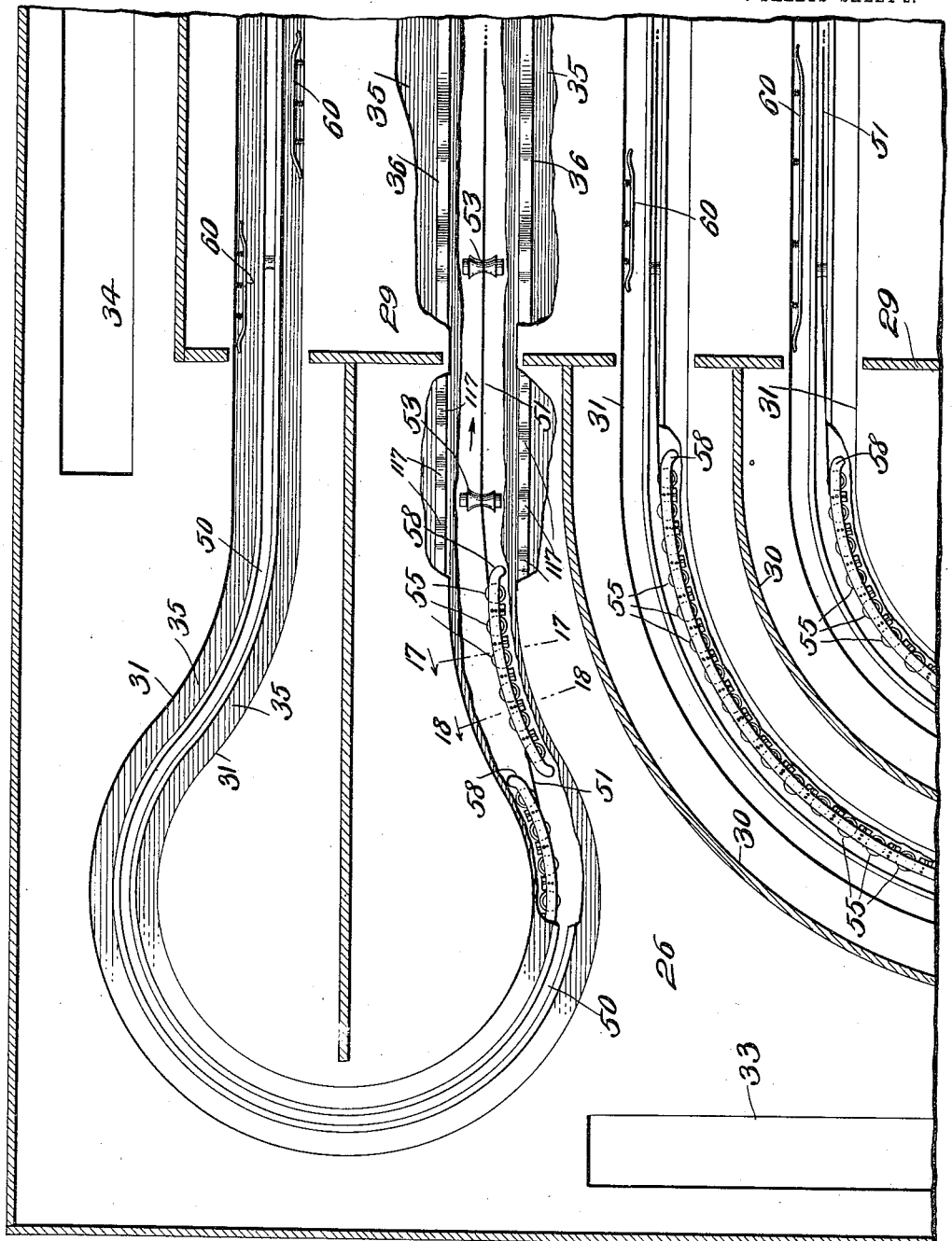

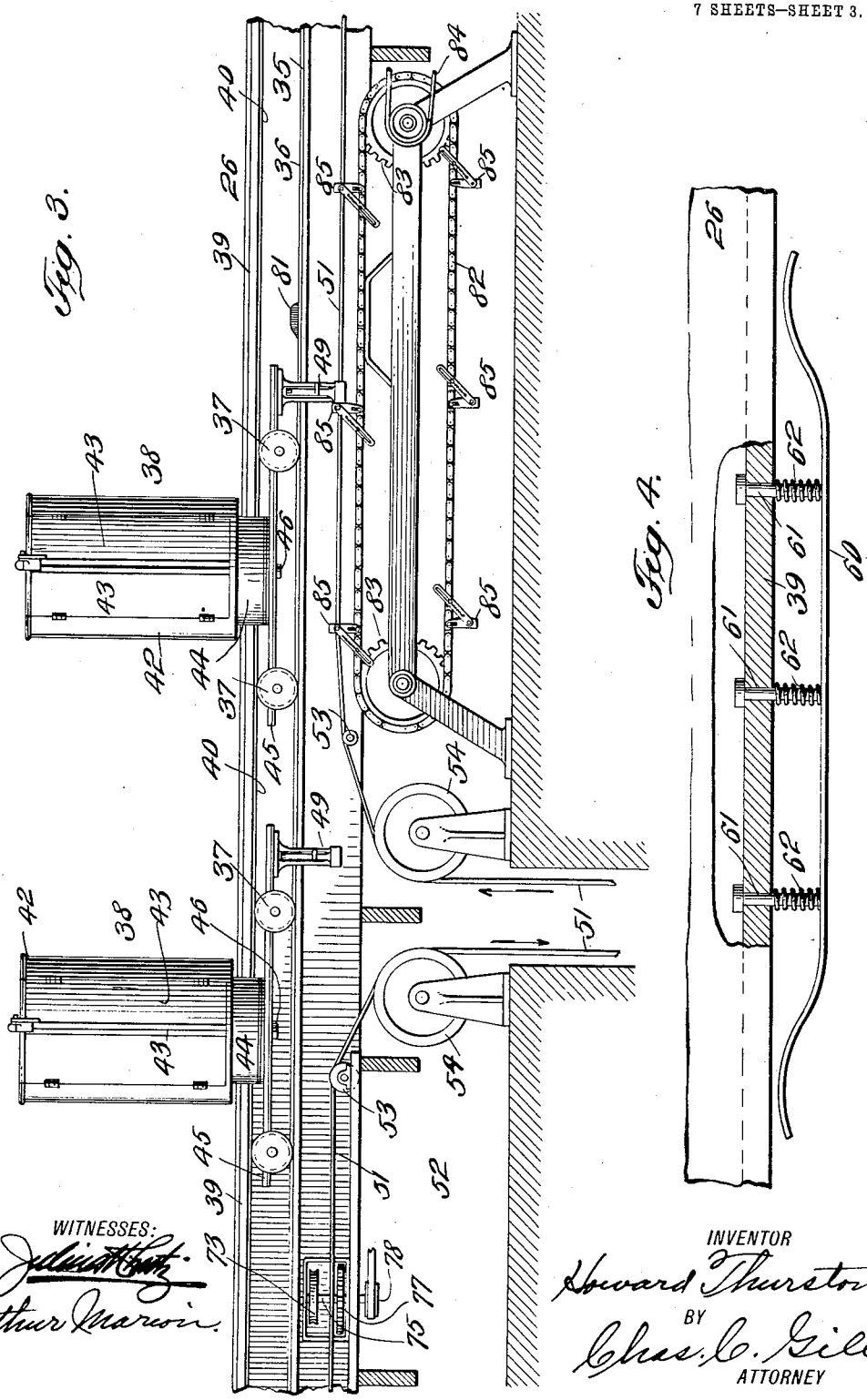

H. THURSTON.
AMUSEMENT APPARATUS.
APPLICATION FILED MAY 25, 1912.
1,083,308.
Patented Jan. 6, 1914.
7 SHEETS—SHEET 4.
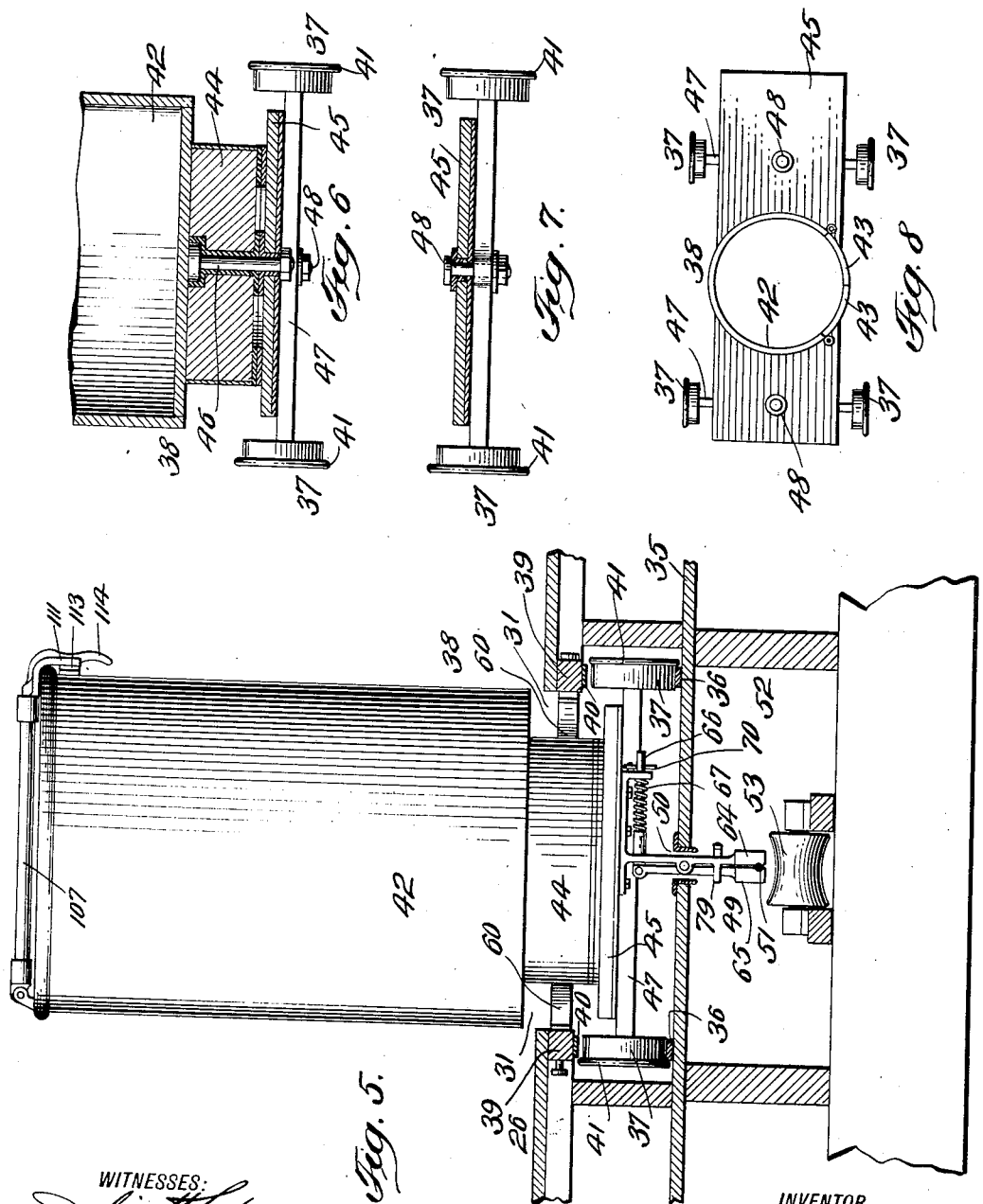
WITNESSES:
INVENTOR
Howard Thurston
BY
Chas. C. Gill
ATTORNEY

H. THURSTON.
AMUSEMENT APPARATUS.
APPLICATION FILED MAY 25, 1912.

1,083,308.

Patented Jan. 6, 1914.

7 SHEETS—SHEET 5.

WITNESSES:

INVENTOR
Howard Thurston
BY
Chas. C. Gill
ATTORNEY

H. THURSTON.
AMUSEMENT APPARATUS.
APPLICATION FILED MAY 25, 1912.
1,083,308.
Patented Jan. 6, 1914.
7 SHEETS—SHEET 6.
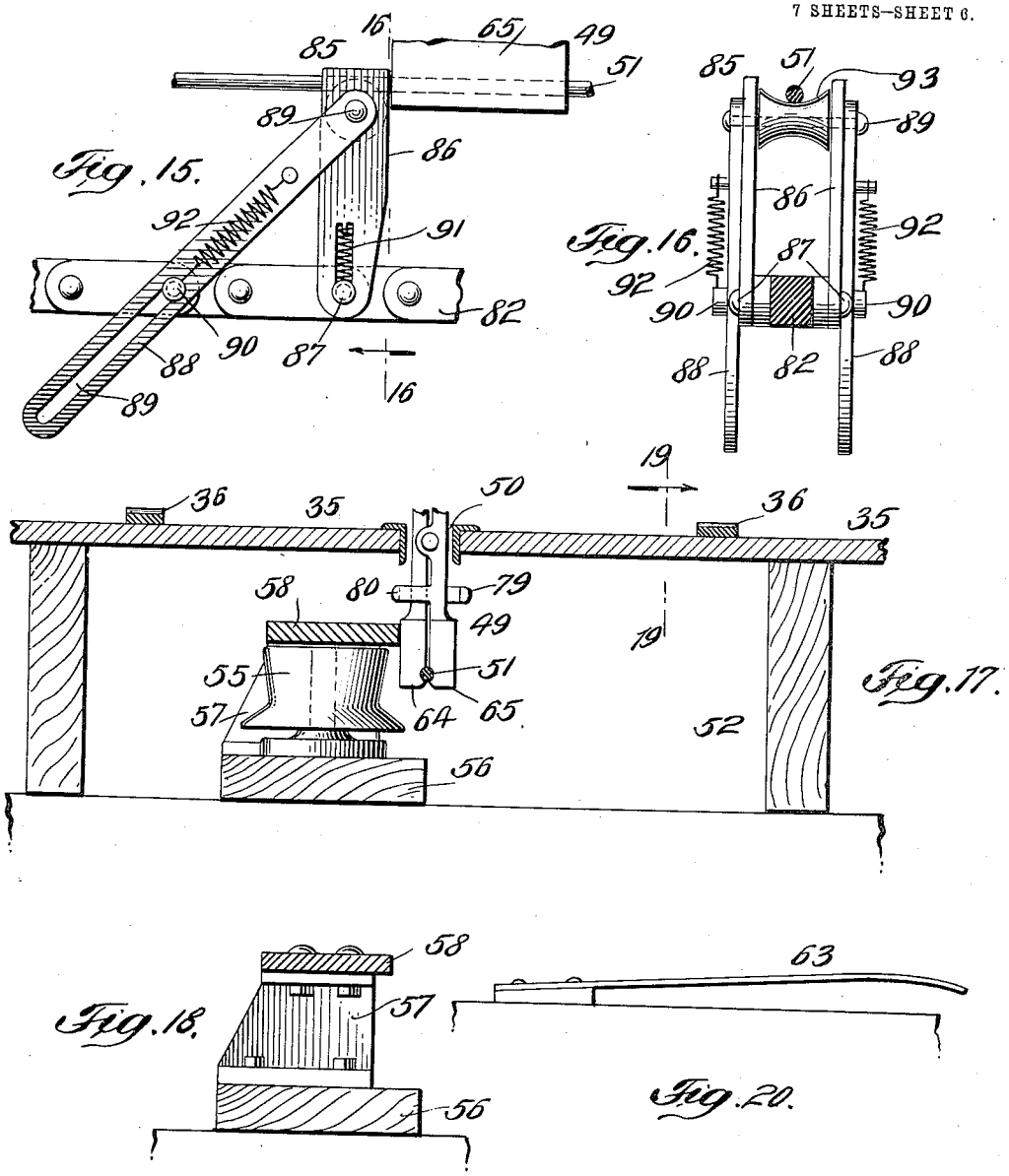
WITNESSES:
INVENTOR
Howard Thurston
BY
Chas. C. Gill
ATTORNEY H. THURSTON.
AMUSEMENT APPARATUS.
APPLICATION FILED MAY 25, 1912.
1,083,308.
Patented Jan. 6, 1914.
7 SHEETS—SHEET 7.
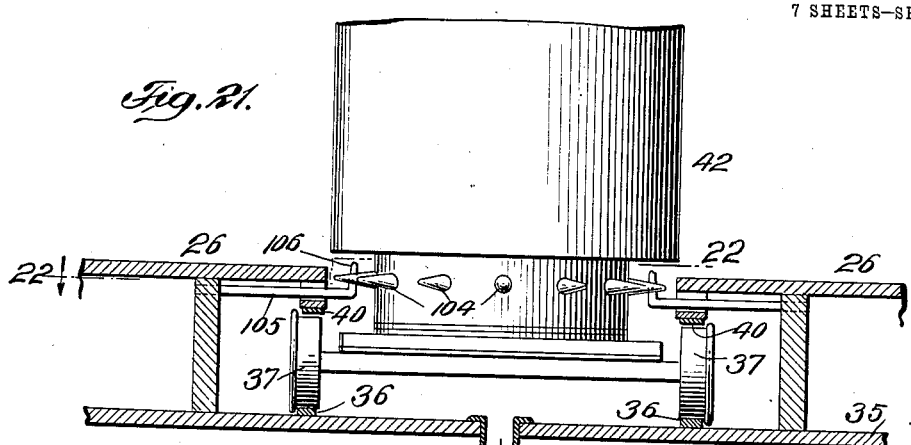
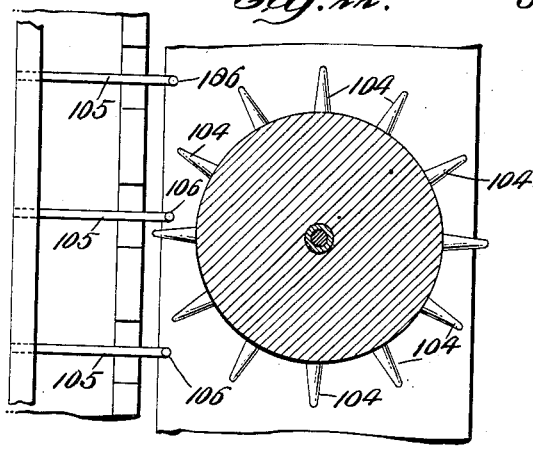
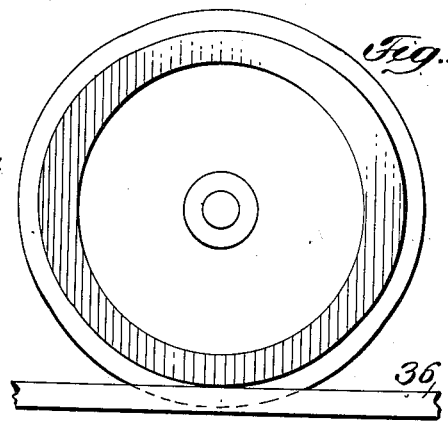
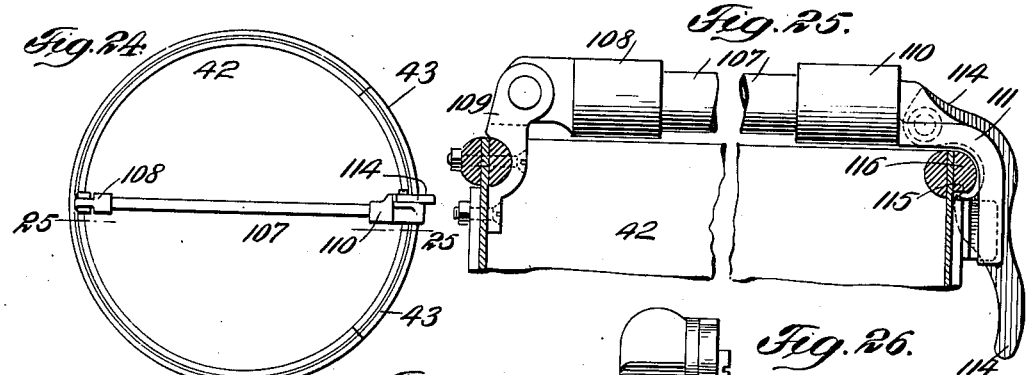
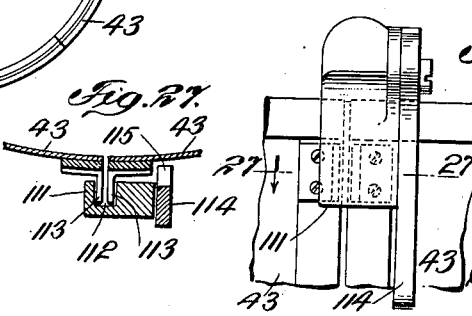
WITNESSES:
INVENTOR
Howard Thurston
BY Chas. C. Gill
ATTORNEY

UNITED STATES PATENT OFFICE.

HOWARD THURSTON, OF COSCOB, CONNECTICUT.

AMUSEMENT APPARATUS.

1,083,308. Specification of Letters Patent. Patented Jan. 6, 1914.

Application filed May 25, 1912. Serial No. 699,634.

*To all whom it may concern:*

Be it known that I, HOWARD THURSTON, a citizen of the United States, and a resident of Coscob, in the county of Fairfield and State of Connecticut, have invented certain new and useful Improvements in Amusement Apparatus, of which the following is a specification.

The invention relates to improvements in amusement apparatus, and it consists in the novel features, structure, arrangements and combinations of parts hereinafter described, and particularly pointed out in the claims.

The object of the invention is to provide an amusement apparatus for use in halls or at parks, seaside resorts, and the like, by which a number of persons in pairs in individual cars may be carried along a circuitous path arranged to impart to the cars undulating and turning or angular movements on their vertical axes, whereby the individuals in pairs standing upon the cars receive movements corresponding with or sufficiently approximating those of the waltz or other round or analogous dance, although the individuals themselves stand motionless upon the cars. The movements of the cars will be timed with dance-music to be played by a band or mechanical instrument so that there will be a harmonious relation between the motions of the cars with the individuals thereon and appropriate dance-music. I shall preferably inclose the apparatus within a building and cause a number of the cars suitably spaced apart to travel along the pathway provided therefor, and by preference the central portion of the building will be partitioned off from the end portions thereof and exposed to the light, while said end portions are darkened, so that spectators may observe the movements of the cars during portions of the travel of the latter, and that during other portions of their travel the cars may pass through darkened chambers to vary the effect, mystery and pleasure afforded by the apparatus.

The invention also comprises means for stopping and starting the cars at a suitable platform where passengers may alight from the cars and other passengers enter the same preparatory to the stopped cars being again started in motion, the stoppage of the cars in succession to permit passengers to alight and the initiating of these cars, after having been supplied with new passengers, in motion along the circuitous path of the apparatus being accomplished without interrupting the cars that are in transit and in synchronous timing, with respect to their dance-actions, with the cars that are in motion and with the accompanying music furnished.

The cars each to carry two standing passengers separated by an upper partition-bar, have, each, a vertical cylindrical open-top body provided with a door or doors and mounted to turn angularly on a carrying platform having wheels to engage track-rails provided along the circuitous path, and said cars are each provided with a gripping device to engage an endless cable by which they are drawn along said rails and which cable is actuated from a suitable engine. The cars each have means to, during the travel of the car, move against other means arranged along opposite sides of the path of the car to effect turning motions on a vertical axis of the body of the car, while at the same or other appropriate times the cars have undulating movements imparted to them.

The cable drawing the cars may have a variable speed imparted to it by the engine, but whatever the speed of travel of the cable and the consequent timing of the dance-motions of the cars connected therewith, the accompanying dance-music furnished should be timed accordingly, and hence I provide a mechanical conductor or timer to be operated from the engine for indicating the time of the dance action of the cars and to be followed by the music. Ordinarily the motions of the cars will be harmoniously timed to customary dance music but the effect may be varied by modifying the timing of the cars from the driving engine and under such circumstances the timing of the music should vary accordingly. I deem it preferable under all circumstances that the dance-actions of the cars should be denoted by a mechanical indicator operable from the driving engine, so that the music furnished may be timed synchronously therewith.

Figure 9:
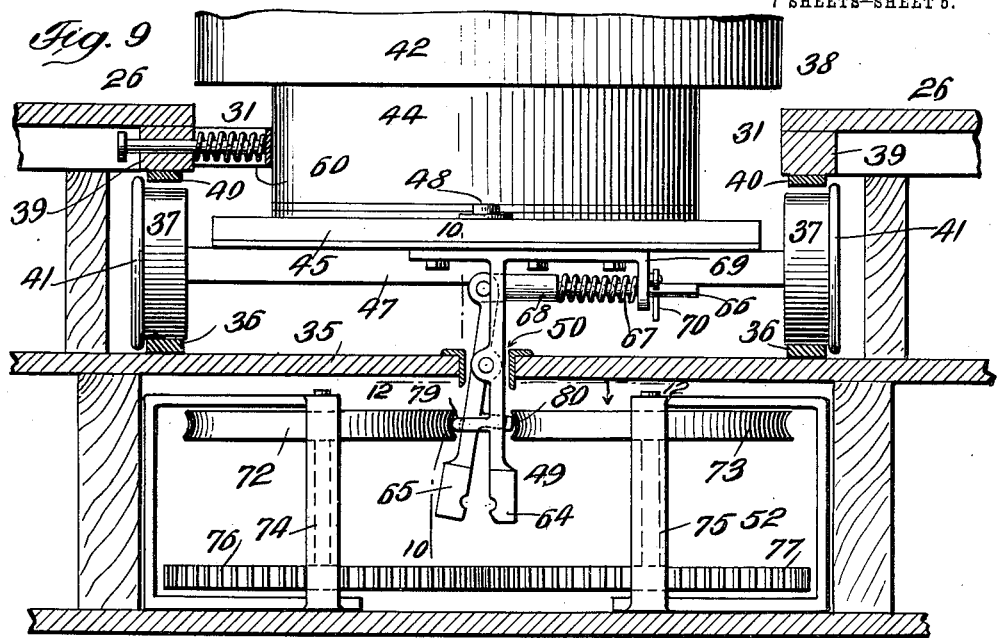
Figures 10, 11:
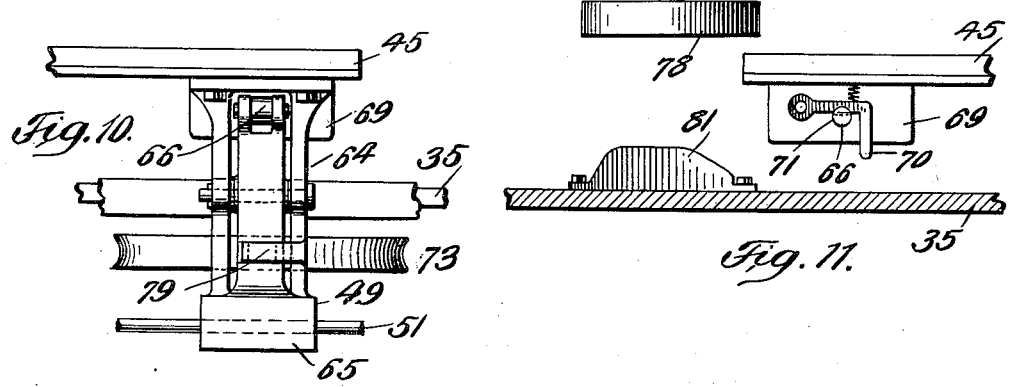
Figures 12, 13:
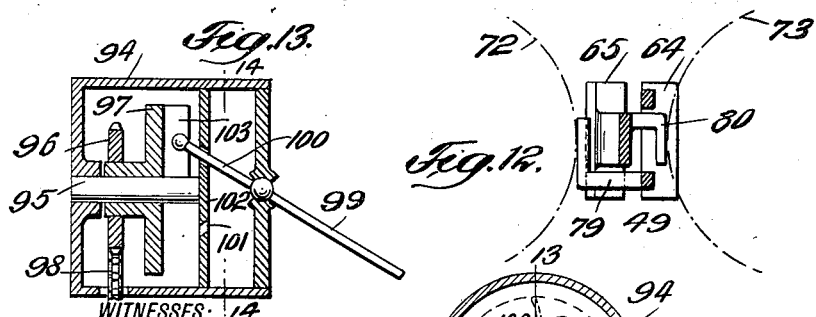
Figure 14:
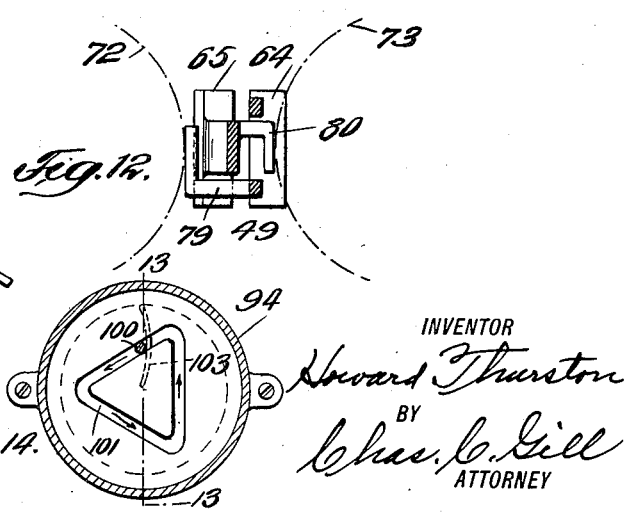

The invention will be fully understood from the detailed description hereinafter presented, reference being had to the accompanying drawings, in which:

Figure 1 is a horizontal section through a building equipped with apparatus constructed in accordance with and embodying the invention; Fig. 2 is an enlarged top view, partly broken away and partly in section, of the same, Fig. 2 representing on a larger scale the upper left hand portion of Fig. 1; Fig. 3 is a sectional view, on a larger scale than Fig. 1, through a portion of the flooring and base of the apparatus and illustrates a portion of the driving cable for the cars, the means for arresting the cars or releasing them from the cable adjacent to the passenger-platform shown at the lower portion of Fig. 1, and the means for again starting the cars or reconnecting them with the endless traveling cable; Fig. 4 is a detached top view, partly broken away and partly in section, of a portion of one side of the tramway or slot through which the lower circular turn-table section of the cars travel and illustrates an elongated spring bar against which said section of the car is carried and which results in the car having imparted to it a swiveling or turning motion on its vertical axis; Fig. 5 is a transverse section on a larger scale through a portion of the flooring of the apparatus and illustrates one car having its lower turn-table portion in the tramway of the circuitous path taken by the cars and the truck wheels of the cars on the tracks provided therefor; Fig. 5 also illustrates the grip employed by me for connecting the cars with the endless traveling cable; Fig. 6 is a vertical transverse section through the car and its platform and is presented to illustrate the manner of mounting the car upon the platform so that the body of the car may have imparted to it a turning or angular motion in either direction; Fig. 7 is a transverse section through the platform of the car about in line with the wheels thereof; Fig. 8 is a top view, on a small scale, of one of the cars; Fig. 9 is an enlarged transverse section through a part of the flooring of the apparatus and illustrates the grip-releasing mechanism for permitting the cars to come to a stop adjacent to the passenger-platform, shown at the lower part of Fig. 1; Fig. 10 is a side elevation, partly broken away, of a portion of the parts shown in Fig. 9, the view being taken on the dotted line 10—10 of Fig. 9 and looking toward the right; Fig. 11 is a detached vertical section through a portion of the apparatus taken at the point where the cars are restored to the cable for being started in motion, the lower portion of Fig. 11 representing an elevation or block arranged in the path of the latch shown at the upper part of Fig. 11 which, in the position shown, holds the grip in an inoperative position; when the car has been moved until the latch strikes against the projection, said latch becomes elevated from the spring grip-rod and releases the latter to permit the grip to close on the cable and thereby connect the car therewith; Fig. 12 is a sectional view through a portion of the grip mechanism taken on the dotted line 12—12 of Fig. 9; Fig. 13 is a vertical longitudinal section through a mechanical conductor or time indicator driven from the engine for denoting the time at which the music shall be performed in harmonizing the same with the speed of travel of the cars, the section being on the dotted line 13—13 of Fig. 14; Fig. 14 is a vertical section through the same on the dotted line 14—14 of Fig. 13; Fig. 15 is an enlarged view of a portion of the starting mechanism shown at the right hand side of Fig. 3; Fig. 16 is a vertical section of the same on the dotted line 16—16 of Fig. 15; Fig. 17 is a transverse section through a portion of the flooring of the apparatus taken, say, on the dotted line 17—17 of Fig. 2 and illustrates the grip in engagement with a guiding bar at the period at which a car may be rounding one of the curves of the circuitous path; Fig. 18 is a like section, on the dotted line 18—18 of Fig. 2, showing the detail of supporting the guiding bar shown in Fig. 17; Fig. 19 is a vertical section through a portion of the flooring of the apparatus on the dotted line 19—19 of Fig. 17, Fig. 19 being presented to illustrate more fully the undulating character of the track rails upon which the wheels of the car travel; Fig. 20 is a detached view, partly broken away, of a modified arrangement to that shown in Fig. 4, for effecting the angular motion of the cars during their travel along the circuitous path; Fig. 21 is a vertical section, partly broken away, through the upper and lower floorings of the apparatus and illustrates a modified means for effecting the turning of the car-bodies on their vertical axes; Fig. 22 is a horizontal section through a portion of the same on the dotted line 22—22 of Fig. 21; Fig. 23 is a side elevation of an eccentric car wheel and is presented to indicate that the rising and falling or undulating movements of the car bodies may be obtained by the employment of eccentric wheels in lieu of means directly at the track rails; when the eccentric wheels are made use of they should be geared together, either directly or indirectly, so that the predetermined movements of the car shall be uniformly and positively attained; Fig. 24 is a detached top view of one of the car-bodies; Fig. 25 is an enlarged vertical section, partly broken away, through the upper portion of the same on the dotted line 25—25 of Fig. 24; Fig. 26 is a front elevation of the upper central portion of the car-body, looking at the right hand side of Fig. 25, and is presented to illustrate the means for securing the transverse partition bar in operative position and locking the doors of the car-body in their closed position, and Fig. 27 is a horizontal section through a portion of the same on the dotted line 27—27 of Fig. 26.

In the drawings, 25 designates a suitable building for inclosing the apparatus, and which building will preferably be of rectangular cross-section and possess a flooring 26, a suitable platform 27 for passengers and attendants, and suitable vertical partitions 29 sub-dividing the room into a central chamber in line with said platform and which will be suitably lighted, and other suitable partitions 30 which will form darkened chambers at opposite sides of the centrally lighted space through which the cars will travel and which by being darkened will add to the novelty and mystery of a trip through the apparatus.

The flooring 26 is provided with a slot or pathway 31 for the cars, and this slot is of circuitous formation, as shown, so that the cars may have a maximum travel along their passage on the flooring 26 and some of them be caused to travel in one direction while others at certain portions of the flooring travel in an opposite direction, the purpose being as nearly as may be to present on the flooring 26 an imitation of the floor of a ball-room with the dancers engaged in waltzing thereon and moving in various directions over the same. Adjacent to the platform 27 the flooring is provided with a branch slot 32 within which the cars will be at rest so that passengers may alight from them and other passengers enter the cars preparatory to the latter being set in motion along the circuitous pathway. The cars will come to a stop at say the left hand side of the platform 27 and be manually pulled from the main slot 31 into the branch slot 32 and then allowed to stop along the inner edge of said platform. After the passengers have entered the cars to be set in motion said cars will be moved along the right hand end of the branch slot 32 and restored to the main slot 31 and be caught upon the cable by which the cars are caused to travel. At the outer portions of the room the flooring will be provided with auxiliary slots 33, 34, for the storage of unused cars, and said slots 33, 34 are arranged to be placed into communication with the auxiliary slot 32, so that the cars not in use may be moved into said auxiliary slot and thence transferred to the main slot 31 for use.

Suitably below the flooring 26 is provided a strong lower flooring 35 having supported thereon track rails 36 for the wheels 37 of the cars which I number 38. The track rails define a circuitous path or roadway corresponding with the line of the slot 31 in the flooring 26. The flooring 26 has on its lower side along the edges of the slot 31 beams 39 (Fig. 9) which support on their lower surfaces upper rails 40 directly over the rails 36 and wheels 37, and said wheels 37 are formed on their outer faces with peripheral flanges 41 which coöperate with the rails 36, 40 in preventing the cars from leaving the rails 36 or having any other than the predetermined motion intended for them. The rails 36 are undulating along their upper surfaces, as represented more clearly at the right hand side of Fig. 2 and in Fig. 19, and this formation of the rails is to impart an undulating movement to the cars traveling over them and to the passengers in said cars.

The cars 38 correspond with one another in structure, and each car is formed with an upper cylindrical body portion 42 to receive the passengers, and said body is preferably provided with vertical doors 43 so that the passengers may be closed within the body 42. The body 42 extends upward to a sufficient height to prevent passengers falling, by accident, therefrom, and is intended to receive only two passengers in standing position. The body 42 has secured to its lower side a vertical drum 44, which is secured upon a rectangular platform 45 by means of a swiveling pin or king-bolt 46, the latter forming a central pivot around or with which the drum 44 may turn in either direction, it being intended that during certain portions of the travel of the car the body 42 shall be turned angularly in one direction and thereafter in the opposite direction.

The platform 45 may be of any suitable construction and has pivotally secured to its lower side, near its ends, axles 47 for the wheels 37. The axles 47 are secured to the platform 45 by pivot-bolts 48 so as to enable the cars to readily follow the curves formed in the circuitous slot 31 and also enable the wheels 37 to follow the curves in the rails 36, 40. Each car 38 is equipped with a suitable cable-grip 49, shown in the drawings as fastened to the lower front portion of the platform 45 and extending downwardly through a slot 50 in the flooring 35 between the track rails 36. The slot 50 will follow the same outline as the slot 31 in the flooring 26 and also the outline presented by the rails 36. The grip 49 may be of varied construction, and its purpose is to connect the car with an endless traveling cable 51 driven by a suitable engine, not shown, and extending through a chamber 52 below the flooring 35. Suitable pulleys 53 are provided for the cable 51, and at the points where the cable passes to and returns from the engine or other motive power, I provide, as shown in Fig. 3, pulleys 54 of larger character therefor. At certain portions of the line of travel of the car, particularly at curved portions thereof, I provide vertical pulleys 55 of the character illustrated more clearly in Fig. 17. The pulleys 55 are mounted upon vertical pins or axes secured upon lower beams 56 which, by means of vertical blocks 57, support a guiding bar 58 directly over said pulleys 55. The bar 58 is curved correspondingly with the curvature of those portions of the line of travel of the car at which they are located, and as may be seen in Fig. 17, the inner edge of the bar 58 projects beyond the adjacent portions of the pulley wheels 55 and operates as a tramway or guide for the grip 49 so as thereby to aid the car in smoothly following the curves of the pathway.

The cable 51 travels incessantly, and hence all of the cars connected with it by the grips 49 will be drawn along the pathway defined by the slot 31 in the flooring 26 and by the track rails 36, and, as hereinbefore mentioned, the cars while in transit will have an undulating movement imparted to them by the undulating surfaces of said rails 36. It is the purpose, however, that the car bodies shall have a turning or angular motion on their vertical axes during the travel of the cars, and to accomplish this purpose I pivotally mount the car bodies and equip them with the vertical drums 44, as hereinbefore explained, and also secure to the beams 39 carrying the upper rails 40, spring bars 60, shown in detail in Fig. 4, projecting laterally in the path of and in horizontal line with the drums 44. When the cars during their line of travel carry their drums 44 along the bars 60, said bars by yieldingly engaging the drums 44, will effect the turning thereof and consequently impart to the car bodies a turning or angular motion. The spring bars 60 are located at various positions in suitable order at opposite sides of the pathway of the cars, and hence they operate to turn the car bodies first in one direction and thereafter in the opposite direction, these movements being intended to imitate the turning motions that are incident to natural waltzing. The bars 60 may be supported from the beams 39 on the ends of bolts 61 carrying coiled springs 62 thereon and extending at their outer ends freely through said beams. When a drum 44 of a car rides against the bar 60, the springs 62 will be compressed and the bolts 61 slide inwardly through the beam 39. The springs 62 must, however, exert sufficient pressure against the drum 44 to effect the rotation of the body of the car. In Fig. 20 I illustrate a modified construction for the spring bar 60 and therein number the corresponding bar 63. The bar 63 is simply a plain steel or other spring bar fastened at one end only and curving into the pathway of the cars. I may employ the bar 63 at certain portions of the pathway of the cars and the bar 60 at other portions thereof, or I may modify the constructions of both the bar 60 and bar 63, the main purpose being, whatever form of bar is used, to effect by the engagement of the drum 44 therewith, the turning of the car body on its vertical axis.

The cable-grip 49 for each car comprises a rigid member 64 connected with the car-platform 45 and a clamping-member 65 pivoted to the member 64 and having at its upper end a hinged laterally extending rod 66 (Fig. 9) on which a coiled spring 67 is placed to normally hold the member 65 in its operative position shown in Fig. 5. The rod 66 extends through a guide sleeve 68 and lug 69, and between said sleeve and lug the spring 67 is confined. On the outer face of the lug 69 is pivoted a right-angle latch bar 70 (Fig. 11) adapted to engage a recess 71 in the rod 66 and hold the clamping grip-member 65 in its inoperative position shown in Fig. 9. When the latch-bar 70 is tilted to release the rod 66 the spring 67 restores the grip-member 65 to its operative position. The means for moving the clamping grip-member 65 to its inoperative position to be engaged by the latch 70, release the car from the cable 51 and permit the car to become at rest, comprise two horizontal wheels 72, 73 disposed below the flooring 35 adjacent to the left hand portion of the auxiliary slot 32 and passenger platform 27 (looking at Figs. 1, 3 and 9), vertical shafts 74, 75 carrying said wheels, intermeshing gear-wheels 76, 77 on the lower ends of said shafts, a drive-wheel 78 on the shaft 75 connected by a belt or otherwise with the main engine or driving mechanism, an arm 79 on the grip-member 64 to engage the wheel 72 as a point of resistance, and an arm 80 on the grip-member 65 to engage the wheel 73 and be thereby with said member 65 forced outwardly to relieve the grip from the cable 51 and move the rod 66 outwardly in opposition to the force exerted by the spring 67 to a position at which it may be engaged by the latch 70. Thereupon the car having been released from the cable 51 will come to a stop and may be pushed or pulled into the auxiliary slot 32 of the flooring 26 and located at the edge of the passenger-platform 27.

When it is desired to restore the car, arrested at the platform 27, into operation, it may be pushed or pulled from the auxiliary slot 32 into the main slot 31 and moved along said main slot until the latch 70 of its grip-mechanism strikes the elevation or projection 81 (Figs. 3, 11) and is thereby turned upwardly from the recess 71 of the rod 66 to free said rod and permit the spring 67 to close the clamping grip-member 65 against the cable 51, whereupon the car will start into regular operation. It is desired that a car when started into operation shall not be thus started in a haphazard way but in timing with the drive of the engine and accompanying waltz-music, and hence while I may manually push the car into and along the flooring-slot 31 until the projection 81 turns the latch 70 and permits the grip to engage the cable 51, I prefer to set the car into operation by mechanical means actuated from the engine, such means being illustrated in Figs. 3, 15 and 16 and comprising an endless sprocket chain 82, sprocket wheels 83 on which said chain is mounted, a drive 84 for actuating said wheels and chain from the engine, and members 85 carried by said chain for engaging the grip 49 of the car and moving the car until its latch 70 passes against the projection 81 and frees the grip-member 65 to clamp against the cable 51. The chain 82 is in line with the main slot 31 and hence I manually move the car from the slot 32 into the slot 31 in position for one of the members 85 carried by said chain to engage the grip of the car and move the car until its latch 70 is carried against the projection 81, whereupon the said latch will be freed from the grip-rod 66 and the grip will engage the cable 51 and the car will be drawn along by the cable. The chain-members 85 are of special construction and their details are illustrated in Figs. 15 and 16, from which it will be seen that each of said members comprises a pair of bars 86 secured on pivots 87 to the chain 82 and normally extending at right angles thereto, a pair of links 88 connected by a pivot pin 89 to the outer ends of the bars 86 and slotted, as at 89, at their inner portions and freely receiving at said slots pins 90 rigid with said chain, springs 91 interposed in slots in said bars 86 normally projecting said bars outwardly, and springs 92 normally drawing the links 88 outwardly and enabling said links to act as braces for the bars 86 when said bars engage the grip 49 of a car. The chain-members 85 are equally spaced apart and each pair of bars 86 thereof carries on their pivot pin 89 a pulley wheel 93 for the cable 51 and which pulley wheel holds the cable in position to be engaged by a grip 49.

The chain members 85 may, if struck by a grip 49 when a car is being moved from the auxiliary slot 32 into the main slot 31, turn therefrom on the pivots 87, the slots in the links 88 being provided to permit this movement; and after a grip 49 has thus turned one of the members 85 forwardly and passed said member, the springs 92 will restore the member to its normal position with the upper ends of the bars 86 then at that side of the grip enabling them by the engagement therewith to move the car along until the latch 70 is acted upon by the projection or obstruction 81. The springs 91 are provided in the bars 86 to enable said bars to yield inwardly when required. Ordinarily the springs 91 are not required except as a precaution against accident.

There might be an occasion at which a chain member 85 might be in motion with the chain 82 around the left hand gear wheel 83, looking at Fig. 3, and be struck on its upper end by a grip 49 of a car then being shoved from the auxiliary slot 32 into the main slot 31, and on any such occasion the springs 91 would yield to the blow of the grip against the end of the chain member 85 and allow the grip to pass on. If the springs 91 were not provided and an approaching grip 49 should squarely strike the end of the chain member 85, there might be a breakage of some of the parts. Since the chain members 85 are equally spaced apart their action in restoring a car to the cable 51 is regular and will be in proper timing with the motions of the other cars already in transit. The chain members 85 thus operate to support the cable 51 in a suitable position at which it may be assuredly engaged by the grips 49 and also in a proper manner by engaging the rear sides of the grips move the cars one after another into operation.

It is highly desirable that the music and movements of the cars in transit shall be in correct timing, and hence I provide the mechanical conductor or time indicator, shown in Figs. 13 and 14, this conductor or indicator being driven by the engine or a part set in motion therefrom so that the actual timing of the cable 51 and motions of the cars will be denoted by the mechanical conductor or indicator and may be correctly followed by the band or means furnishing the music. The mechanical conductor comprises a suitable shell or casing 94 inclosing a fixed axle 95 on which is mounted a sprocket wheel 96 and disk 97 rotating therewith. The wheel 96 may be driven by a sprocket chain 98. In the front wall of the casing 94 is universally mounted an intermediate portion of a baton 99 having an outer exposed portion, and an inner member 100 which is confined in a triangular cam 101 formed in a partition plate 102 located adjacent to the disk 97. The inner extremity of the baton is driven by a curved blade 103 carried by the disk 97. During the rotation of the disk 97 the inner portion 100 of the baton is caused to travel through the triangular cam slot 101, with the result that the outer exposed end of the baton will perform a three-beat movement for the guidance of the band and in harmony with the movements of the cars in transit. The partition 102 is formed of a central plate fastened on the end of the fixed axle and adjacent portions integral with the casing 94. The mechanical conductor indicates the timing of the movements of the cars, and this timing will be followed by the music. The engine may be given a variable speed in accordance with the results desired, and in all such cases the variations in the timing of the movements of the cars will be denoted by the baton 99, which will enable the band to vary the timing of the music accordingly. It is intended that the movements of the cars shall be in accordance with proper waltz or other dance timing, but the timing of these movements may be readily varied to meet the pleasure or will of the passengers carried by the cars or the character of the dance to be imitated by the cars and passengers thereon.

In Figs. 21 and 22 I illustrate a modified arrangement for effecting the turning or angular movement of the car-bodies on their vertical axes, the same comprising the employment of radial pins or projections 104 on the drum portion 44 of the car-body and spring rods 105 fastened below the upper flooring 26 and having vertically bent ends 106 extending in the path of said pins 104. During the travel of the car on the rails 36 the pins 104 by engaging the rods 105 and being obstructed thereby, will effect the turning motion of the car-body. I employ a series of the rods 105 and a series of the pins 104, as shown in Fig. 22. The rods 105 are fastened at their inner ends and at their outer portions are permitted to yield to a limited extent, and this arrangement is to enable the car-body to be set into turning motion without undue suddenness or jar. The pins 104 and rods 105 are intended as substitutes for the bars 60, 63, and Figs. 21 and 22 are presented to indicate that the angular motion of the car-bodies may be attained by various means and that the present invention is not confined to any special mechanism for imparting to the car-bodies a turning motion during the travel of the cars.

In Fig. 23 is shown a modified construction of car wheel. The wheels 37 shown in Fig. 9 are concentric and free to rotate on the ends of the axles 47, and in order to secure the rising and falling or undulating movement of the car bodies during the travel of the cars, I employ when the concentric wheels 37 are made use of, undulations on the track rails, but the rising and falling or undulating movements of the car-bodies may also be attained by the employment of eccentric wheels such as I illustrate in Fig. 23. When eccentric wheels are employed for the cars they should be geared together so that they may always maintain their predetermined relation, with respect to the eccentricity thereof, to one another, in order that the proper uniform predetermined undulating movements may be attained. If the eccentric wheels were free on the ends of the axles 47, said wheels would not remain in predetermined relation, with regard to their eccentricity, to one another, but would soon lose such relationship and create an irregular and undesirable movement of the car. The car-bodies 42 are cylindrical and the doors 43 thereof extend from the bottom to the upper edge of the said bodies. It is preferable to provide the upper ends of the car-bodies with a transverse partition bar 107 and to expose said bar slightly above the upper edges of the said bodies, as represented more clearly in Figs. 5 and 25, the bar 107 being utilized to separate, to a degree, the persons standing in the car-body and to prevent one of said persons from being jostled against the other to an undue extent especially when the cars are passing around the curves of a circuitous path. The bar 107 will preferably be in the form of a rod having at one end a head 108 which is pivotally secured or hinged to a lug 109 fastened to the edge of the car-body directly opposite to the division line between the doors 43. The other end of the rod 107 is provided with a head 110 carrying an arm 111 which is adapted to extend downwardly below the upper edge of the car-body and to engage at a recess 112 therein (Figs. 25, 26, 27) a pair of corresponding ears 113 secured to the doors 43 near their adjoining edges; the engagement of the arm 111 with the ears 113 on the doors 43 serves to lock the doors in their closed position. Upon one side of the arm 111 is pivotally secured a latch 114 for retaining the free end of the partition bar 107 in its horizontal position extending across the top of the car-body. The latch 114 is formed with a suitable handle, and when turned to its lower position, shown in Fig. 25, carries a shoulder 115 thereon below a projecting rim 116 secured to the upper edges of the doors 43. The rim 116 is a section of an annular band extending entirely around the upper edge of the body of the car for the purpose of strengthening the same. When the latch 114 is in its operative position shown in Fig. 25, it serves to latch the partition bar 107 in position across the top of the car-body and at this time the arm 111 carried by said bar locks the doors 43 in their closed position. When it is desired to open the doors 43 the latch 114 is turned outwardly in a direction therefrom and the bar 107 is elevated or turned upwardly on its hinged end; thereupon the doors 43 may be opened to discharge or admit passengers, as the case may be. After the passengers have entered the car-body 42, the doors 43 will be closed and the partition bar 107 lowered to lock the doors and become latched at its free end.

The operation of the apparatus has largely been indicated in the description hereinbefore given.

In the construction shown the aim has been to provide mechanism whereby the cars may have imparted to them motions corresponding with the natural movements couples have in waltzing. The undulating movements may be imparted to the cars and the passengers carried thereby either from the track-rails (Fig. 19) or by eccentric wheels (Fig. 23) as hereinbefore indicated. I prefer to effect the undulating movements from the track rails. The turning or angular movements are imparted to the car-bodies by the engagement of the lower cylindrical portions thereof with the laterally projecting bars 60, 63, or by the alternative construction illustrated in Figs. 21 and 22, or by other suitable means. The bars 60 are illustrated in position in Figs. 1 and 2, and they will vary in their disposition along the circuitous path and also vary in length, as indicated at the lower right hand portion of Fig. 2. The bars 60 will be so disposed as to effect the proper turning motions at the proper times and to secure the extent of turning movements required. In waltzing it may be said that during the first two bars of the music (six beats), the car should advance, make a quarter turn to the right, then advance and make another quarter turn to the right, and then, during the next two bars of the music, advance, make one quarter turn to the right, advance and make another quarter turn to the right, and during the next two bars of the music, advance, make a one-half turn to the right, advance and make a full turn to the right, and that during the next two bars of the music the car should advance, the body make one full turn to the right on four beats and then advance—these representing the four phases of the waltzing, and thereafter the same four phases should be repeated with the exception that the turning actions will be to the left instead of to the right. The track-rails will be so constructed that at some parts there will be no undulating movements imparted to the cars.

While I have specified more particularly the construction and arrangement designed for waltzing, it is obvious that the invention is not confined to imparting to the car-bodies the motions of technical waltzing, since the dancing may be varied by varying the speed of the driving power or engine, and also by varying the locations and lengths of the bars 60 by which the turning action of the car-bodies is secured. The broad principle of the invention is to imitate as nearly as may be in the car-bodies and passengers standing thereon, the movements which are natural to round dancing whether of the technical waltz step or other step, the cars having imparted to them at the proper times an undulating or rising and falling movement and at the proper times a turning or axial movement to a suitable extent in an appropriate direction on their vertical axes.

I preferably provide the light chamber of the building containing the apparatus in line with the passenger platform 27 in order that prospective passengers may observe the cars traveling through said chamber, and in order that the passengers on the cars traveling through the light chamber or space and under observation may present an animated appearance, I provide the track rails at the points where the cars pass from the dark chambers into said light chamber with projections 117, as shown in Fig. 2, for imparting rather abrupt lateral rocking motions to the cars, said projections 117 on one rail alternating with those on the opposite rail so that the cars in passing over them will be rocked laterally and more or less jostle the passengers and have them in an animated appearance as they emerge from the dark chamber into the light space or chamber.

The invention is not limited to all of the details of the construction hereinbefore described, since these may be modified in many respects without departing from the spirit of my invention, nor is the invention limited to the precise form of the circuitous path for the cars represented in Fig. 1, since this path may vary and naturally will do so in adapting the apparatus for buildings already constructed and of varying sizes. It is intended, however, wherever possible to erect special buildings for the apparatus so that the building and the entire apparatus may be of permanent and suitable character and as much length of travel given to the cars as may be possible consistent with the dimensions of the building. There are also a number of features hereinbefore described which are not permissible of being claimed herein specifically, and these features and all the mechanisms shown but not claimed herein specifically will be made the subjects of separate applications for Letters Patent.

What I claim as my invention and desire to secure by Letters-Patent, is:

1. An amusement apparatus comprising a flooring having therein a circuitous path, track-rails below the same defining a like path, cars having wheels engaging said rails, platforms above said wheels and bodies mounted on said platforms on vertical axes and adapted to hold two passengers in standing position and provided adjacent to the platforms with vertical cylindrical or drum portions, means for effecting the travel of the cars along said circuitous path, means above said platforms and at opposite sides of said path for engaging the drum-portions of the cars and effecting their turning action in one direction and in the reverse direction, and means for imparting an undulating movement to the cars while in transit.

2. An amusement apparatus comprising a flooring having therein a circuitous path, track-rails below the same defining a like path, cars having wheels engaging said rails, platforms above said wheels and bodies mounted on said platforms on vertical axes and adapted to hold two passengers in standing position and provided adjacent to the platforms with vertical cylindrical or drum portions, means for effecting the travel of the cars along said circuitous path, springbars projecting laterally into said path to be engaged by the drum-portions of the cars in transit for effecting the turning action of the cars in one direction and in the reverse direction, and means for imparting an undulating movement to the cars while in transit.

3. An amusement apparatus comprising a flooring having therein a circuitous path, track-rails below said flooring defining a like path, cars having wheels engaging said rails, platforms and bodies mounted on said platforms on vertical axes and adapted to hold two passengers in standing position, means for effecting the travel of the cars along said circuitous path, means for turning the car-bodies in one and in the other direction on their vertical axes during the travel of the cars, and means for imparting undulating movements to the car-bodies while in transit, the means for turning and the means for imparting undulating actions to the car-bodies being harmoniously proportioned to dance movements.

4. An amusement apparatus comprising track-rails defining a circuitous path, cars having wheels engaging said rails, platforms and bodies mounted on said platforms on vertical axes and adapted to hold two passengers in standing position, means for effecting the travel of the cars along said rails, means for turning the car-bodies in one and in the other direction on their vertical axes during the travel of the cars, and means for imparting undulating movements to the car-bodies while in transit, the means for turning and the means for imparting undulating actions to the car-bodies being harmoniously proportioned to dance movements.

5. An amusement apparatus comprising track-rails defining a circuitous path, a series of cars on said rails having platforms and bodies mounted thereon on vertical axes and adapted to hold passengers, means for effecting the travel of the cars along said circuitous path, means for turning the car-bodies in one and in the other direction on their vertical axes during the travel of the cars, and means for imparting undulating movements to the cars while in transit, combined with means for mechanically indicating the timing of the car-movements for the guidance of the music to be performed in time therewith.

6. An amusement apparatus comprising track-rails defining a circuitous path, a series of cars having flanged wheels mounted on said track-rails and comprising platforms having front and rear swiveled axles carrying said wheels and vertical bodies mounted on said platforms to turn on their vertical axes and adapted to hold two passengers in standing position, upper rails above said track-rails and wheels and normally free of the wheels and to be engaged thereby on any movement of the wheels to leave the track-rails, means for effecting the travel of the cars along said track-rails, means for turning the car-bodies in one and in the other direction on their vertical axes during the travel of the cars, and means for imparting an undulating movement to the cars in transit, the means for imparting undulating actions to and the means for turning the car-bodies being harmoniously proportioned to dance movements.

7. An amusement apparatus comprising a flooring having therein a main slot defining a circuitous path and provided on the lower side thereof along the opposite sides of said slot with beams, a lower auxiliary flooring having track-rails defining a like path, a series of cars on said rails having flanged wheels, platforms and vertical bodies arranged to turn on their vertical axes and carry passengers, means for effecting the travel of the cars along said track-rails, means secured to the facing sides of said beams to engage the cars and turn their bodies in one and in the reverse direction, means for imparting an undulating movement to the cars in transit, and upper rails secured to the lower side of said beams above said track-rails and wheels to aid in retaining the cars on the track-rails.

8. An amusement apparatus comprising a flooring having therein a main slot defining a circuitous path and provided with a passenger platform and an auxiliary slot along the same communicating with said main slot, a lower flooring having track-rails defining a like path, a series of cars mounted on said rails having platforms and bodies mounted thereon on vertical axes and adapted to carry passengers, a continuously traveling cable for simultaneously drawing the cars along said rails, grips on said cars to engage said cable, means at opposite sides of said main slot to turn the car-bodies in one and in the reverse direction, means for imparting an undulating movement to the cars in transit, means adjacent to one end of said auxiliary slot for releasing the car-grips from the cable, and means adjacent to the other end of said auxiliary slot for restoring the grips to the cable, whereby the cars may be moved along said auxiliary slot and allowed to rest as long as desired at said passenger platform.

9. An amusement apparatus comprising a flooring having therein a main slot defining a circuitous path and provided with a passenger platform, a lower flooring having track-rails defining a like path, a series of cars mounted on said rails having platforms and bodies mounted thereon on vertical axes and adapted to carry passengers, a continuously traveling cable for simultaneously drawing the cars along said rails, grips on said cars to engage said cable, means at opposite sides of said main slot to turn the car-bodies in one direction and in the reverse direction, means for imparting an undulating movement to the cars in transit, means adjacent to one end of said platform for releasing the car-grips from the cable, and means adjacent to the other end of said platform for restoring the grips to the cable when the cars are moved thereto.

10. An amusement apparatus of the character described comprising track-rails, a series of cars on said rails having vertical bodies on vertical axes and adapted to hold two passengers in standing position, means for effecting the travel of the cars along said track-rails, means for turning the car-bodies in one and in the other direction on their vertical axes during the travel of the cars, and means for imparting an undulating movement to the cars in transit, the means for imparting undulating actions to and the means for turning the car-bodies being harmoniously proportioned to dance movements.

11. An amusement apparatus of the character described comprising track-rails, and cars having wheels mounted on said rails, platforms above said wheels and vertical bodies pivotally mounted on said platforms on vertical axes and having drum or cylindrical lower portions and adapted to hold two passengers in standing position facing each other, combined with means in the path of said drum or cylindrical portions to effect the turning of the same and the car bodies in one and in the other direction during the travel of the cars, and means for imparting undulating movements to the cars while they are in transit.

12. An amusement apparatus comprising track-rails, a series of cars on said rails having bodies on vertical axes and adapted to hold passengers, means for effecting the travel of the cars along said rails, means for turning the car-bodies in one and in the other direction on their vertical axes during the travel of the cars, and means for imparting undulating movements to the cars while in transit, said car-bodies having side doors and each being adapted to hold two passengers in standing position and provided across its upper end with a partition bar to extend between said passengers.

13. An amusement apparatus comprising track-rails, a series of cars on said rails having bodies on vertical axes and adapted to hold passengers, means for effecting the travel of the cars along said rails, means for turning the car-bodies in one and in the other direction on their vertical axes during the travel of the cars, and means for imparting undulating movements to the cars while in transit, said car-bodies having side doors and each being adapted to hold two passengers in standing position and provided across its upper end with a partition bar to extend between said passengers, combined with means for locking said doors in closed position, and means for maintaining said bar in operative position during the travel of the cars.

14. An amusement apparatus comprising a building subdivided into a light or observation space and darkened chambers, track-rails defining a circuitous path extending through said darkened chambers and back and forth across said space, a series of cars on said rails having bodies on vertical axes and adapted to hold passengers, means for effecting the travel of the cars along said rails, means for turning the car-bodies in one and in the other direction on their vertical axes during the travel of the cars, and means for imparting undulating movements to the cars while in transit, combined with means for imparting a shaking action to the car-bodies adjacent to the exits of the cars from said chambers to said space.

15. An amusement apparatus comprising a building subdivided into a light or observation space and darkened chambers, track-rails defining a circuitous path extending through said darkened chambers and back and forth across said space, a series of cars on said rails having bodies on vertical axes and adapted to hold passengers, means for effecting the travel of the cars along said rails, means for turning the car-bodies in one and in the other direction on their vertical axes during the travel of the cars, and means for imparting undulating movements to the cars while in transit, said rails adjacent to the exits from said chambers to said space being provided with elevations for laterally rocking the cars passing over them in an irregular manner.

Signed at New York city, in the county of New York and State of New York, this 24th day of May A. D. 1912.

HOWARD THURSTON.

Witnesses:
ARTHUR MARION,
CHAS. C. GILL.